(12) United States Patent
Beri et al.

(10) Patent No.: US 10,043,233 B1
(45) Date of Patent: Aug. 7, 2018

(54) DIGITAL MEDIA ENVIRONMENT FOR PROCESSING VECTOR OBJECTS OF VECTOR ARTWORK

(71) Applicant: Adobe Systems Incorporated, San Jose, CA (US)

(72) Inventors: Tarun Beri, Noida (IN); Vineet Batra, Pitam Pura (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 0 days.

(21) Appl. No.: 15/654,914

(22) Filed: Jul. 20, 2017

(51) Int. Cl.
*G06T 1/00* (2006.01)
*G06T 15/00* (2011.01)
*G06T 1/20* (2006.01)
*G06T 11/20* (2006.01)
*G06T 11/60* (2006.01)

(52) U.S. Cl.
CPC ............ *G06T 1/20* (2013.01); *G06T 11/203* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 7,564,456 B1* | 7/2009 | Lindholm | ............... | G06T 11/40 345/418 |
| 8,237,710 B1* | 8/2012 | Marketsmueller | .... | G06T 11/203 345/419 |
| 8,379,025 B1* | 2/2013 | Carr | ...................... | G06T 11/203 345/419 |
| 8,416,260 B1* | 4/2013 | Carpenter | ............. | G06T 15/503 345/423 |
| 9,384,570 B2* | 7/2016 | Bolz | ...................... | G06T 11/203 |
| 9,401,034 B2* | 7/2016 | Hodsdon | ................. | G06T 17/20 |
| 2006/0001679 A1* | 1/2006 | Hamburg | ................ | G06T 11/60 345/620 |
| 2006/0044312 A1* | 3/2006 | Loop | ..................... | G06T 11/203 345/443 |
| 2007/0097121 A1* | 5/2007 | Loop | ....................... | G06T 15/00 345/428 |
| 2007/0097123 A1* | 5/2007 | Loop | ..................... | G06T 11/203 345/442 |
| 2008/0117214 A1* | 5/2008 | Perani | .................... | G06T 11/206 345/441 |
| 2008/0309676 A1* | 12/2008 | Nehab | ....................... | G06T 9/00 345/582 |

(Continued)

*Primary Examiner* — Martin Mushambo
(74) *Attorney, Agent, or Firm* — Wolfe-SBMC (57) ABSTRACT

Techniques for processing vector objects of vector artwork in a digital media environment are described in which the number of vector objects are adaptively reduced at low zoom levels. In an example, a central processing unit (CPU) of a computing device accesses a set of vector objects that are smaller than the size of a pixel in a vector artwork to be rendered by a GPU of the computing device. The CPU selects a subset of the set of vector objects from within the area of the pixel, such as based on locations of the vector objects within the pixel. The CPU generates an additional vector object based on colors of the subset of vector objects. The CPU then outputs the additional vector object in the vector artwork to the GPU, and the GPU renders the additional vector object in the vector artwork.

20 Claims, 7 Drawing Sheets

(56) References Cited

U.S. PATENT DOCUMENTS

| | | | | |
|---|---|---|---|---|
| 2009/0141038 | A1* | 6/2009 | Newaskar | G06T 11/203 |
| | | | | 345/589 |
| 2011/0069065 | A1* | 3/2011 | Hiwada | G06T 15/005 |
| | | | | 345/420 |
| 2011/0285736 | A1* | 11/2011 | Kilgard | G06T 11/203 |
| | | | | 345/584 |
| 2012/0200569 | A1* | 8/2012 | Munkberg | G06T 15/04 |
| | | | | 345/423 |
| 2013/0321456 | A1* | 12/2013 | Hultquist | G01C 21/3667 |
| | | | | 345/629 |
| 2013/0342535 | A1* | 12/2013 | Sylvan | G06T 15/005 |
| | | | | 345/426 |
| 2014/0313206 | A1* | 10/2014 | George | G06T 11/40 |
| | | | | 345/441 |
| 2014/0354661 | A1* | 12/2014 | Balci | G06T 1/20 |
| | | | | 345/522 |
| 2015/0312560 | A1* | 10/2015 | Deering | G02B 13/0085 |
| | | | | 345/1.3 |
| 2017/0287181 | A1* | 10/2017 | George | G06T 11/40 |
| 2018/0033168 | A1* | 2/2018 | Beri | G06T 3/4084 |

* cited by examiner

DIGITAL MEDIA ENVIRONMENT FOR PROCESSING VECTOR OBJECTS OF VECTOR ARTWORK

BACKGROUND

Vector artwork is becoming increasingly more common to create digital art that is smooth and can be scaled indefinitely without loss of quality. Vector artwork can require complex processing operations in order to render vector artwork on high-powered display devices. A graphics processing unit (GPU) is often employed to carry out graphics processing operations to accelerate the creation of vector artwork in a frame buffer intended for output to a display device. Rendering vector artwork on GPUs commonly calls for tessellation (which is regularly performed on a central processing unit (CPU)), where objects in a scene are divided into structures, referred to herein as "vector objects," for rendering. One example of a vector object created by a tessellation operation are geometric primitives, which are simple shapes such as triangles that are used to construct objects in vector artwork. Geometric primitives can be used to construct more complex vector objects such as Bezier curves and Bezier surfaces, which can then be combined to form lines and surfaces in vector artwork.

In order to maintain resolution independence on the display device (i.e., to maintain a same pixel size of the vector artwork), conventional systems perform tessellation of a vector artwork once, and the tessellation is reused at all zoom levels. At each zoom level, additional graphics processing operations are applied to vector objects for rendering, followed by graphics processing operations performed on the pixel level of the display device.

Conventional systems continue to perform time-consuming processing operations such as shading and rasterizing on vector objects even when the vector objects are smaller than the size of a pixel. Consequently, time and processing resources are wasted at low zoom levels in processing vector objects, even when the vector objects may not contribute to even a single output pixel.

SUMMARY

Techniques for processing vector objects of vector artwork in a digital media environment are described. In one example, vector objects are selected that do not contribute to features of an individual pixel, and the selected vector objects are omitted from processing operations by a graphics processing unit (GPU). In this way, the GPU rendering pipeline is applied to a fewer number of vector objects, increasing performance of the GPU and reducing rendering time especially at low zoom levels.

In one example, a central processing unit (CPU) of a computing device accesses a set of vector objects in a piece of vector artwork to be rendered by a GPU of the computing device. The set of vector objects are smaller than the size of a pixel of the vector artwork. Vector objects can include geometric primitives, which are simple shapes (e.g., lines, points, triangles, polygons, and so on) used to construct complex graphic elements of a vector object for display on a display device. Vector objects can also include more complex components of computer graphics, such as Bezier curves, Bezier surfaces, Bezier objects, and so forth, which are commonly used in creating vector artwork. In this example, the set of vector objects are situated at least partially within the area of the pixel, due to the current zoom level of the vector artwork. The CPU selects a subset of the set of vector objects from within the area of the pixel, which may be based on locations of the vector objects within the pixel. The CPU then discards the unselected vector objects, thereby removing these vector objects from any further processing by the CPU or the GPU in generating an additional vector object to be output at the current low zoom level.

The CPU then generates an additional vector object based on colors of the subset of vector objects. The additional vector object may be a single geometric primitive that replaces the subset and is closer in size to the pixel than the individual vector objects that form the subset. If the colors of the subset of vector objects are a uniform color, then the additional vector object is generated in the uniform color. Otherwise, if there is variation in color of the subset of vector objects, the additional vector object is generated using a CPU scanline painting algorithm, an average color of the subset, a randomly selected color of the subset, and so on. The CPU then outputs the additional vector object in the vector artwork to the GPU, and the GPU renders the additional vector object in the vector artwork.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Digital image and vector artwork rendering by a computing device involves significant amounts of computational resources. To render vector artwork, for instance, a central processing unit (CPU) performs a tessellation operation, where objects in the vector artwork are divided into simple structures, referred to herein as vector objects. In order to maintain resolution independence on the display device (i.e., to maintain a same pixel size of the vector artwork), conventional systems perform tessellation of vector artwork or a digital image once, and the tessellation is reused at each zoom level. A graphics processing unit (GPU) may then invoke graphics processing applications such as a vertex shader, tessellation shader, geometry shader, rasterizer, and so forth on individual vector objects before operations are applied on the pixel level for output to a display. When the zoom level on the display changes, conventional systems reuse the tessellation, but the subsequent graphics processing applications continue to be invoked on the individual vector objects multiple times for corresponding zoom levels.

At times, the zoom level of a digital image or piece of vector artwork may reduce to a point where the individual vector objects created in the tessellation are smaller than an individual pixel. In the order of operations of conventional systems, the graphics processing applications such as the vertex shader, tessellation shader, geometry shader, rasterizer, and so forth are still invoked, even at zoom levels where multiple vector objects fit within a single pixel. Thus, operations applied by conventional graphics processing applications in these scenarios result in inefficient use of computational resources, as an individual pixel is not capable of rendering objects smaller than itself. Conventional systems therefore needlessly consume considerable time and processing resources at low zoom levels by invoking these graphics processing applications on vector objects that may not contribute to even a single output pixel. This results in considerable underperformance of the GPU, as the number of vector objects to be processed is disproportionately high compared to the number of pixels to represent the digital image or vector artwork on the display.

Accordingly, techniques and systems are described in which a digital image creation system is configured to process vector objects of digital images or vector artwork by adaptively reducing the number of vector objects at low zoom levels. The digital image creation system, for instance, may be configured to allow creation and editing of digital images and vector artwork as part of an application of a computing device in a variety of different ways. Examples of which include use as part of an online application (via a subscription-based service system), provide opportunities to purchase a good or service, online storage, or other web service that is accessible via a network. Digital images and vector artwork may include a variety of different content that may be stored digitally or electronically, e.g., movies, books, documents, games, applications, images, audio files, and so on.

To begin, a central processing unit (CPU) accesses a set of several different vector objects in a vector artwork to be rendered by a GPU of the digital image creation system. The set of vector objects are smaller than the size of a pixel, and at least some of the vector objects are defined within the area of the pixel. As discussed above, vector objects are structures used to construct complex graphic elements of a digital image or vector artwork for display on a display device. Vector objects include geometric primitives, which are simple shapes such as points, lines, triangles, and polygons used to construct complex structures in digital images or vector artwork. Vector objects also include intermediately complex structures such as Bezier curves, Bezier surfaces, Bezier objects, and groups of geometric primitives and/or Bezier shapes used to create complex geometry in digital images and vector artwork.

In this example, the set of vector objects are situated at least partially within the area of the pixel, due to the current zoom level of the vector artwork. The GPU, for instance, may have previously performed a tessellation operation to generate vector objects at 100% zoom level when the vector artwork was first rendered on a display. Then, the CPU receives an indication that the zoom level changed to 1%, making the vector artwork appear smaller on the display. Reducing the zoom level on the display device may cause the several different vector objects to be situated at least partially within the area of the pixel. For example, the zoom level may cause several geometric primitives, several Bezier objects, or several groups of Bezier objects to be located at least partially within the area of the pixel.

The CPU then selects a subset of the set of vector objects from within the area of the pixel, such as based on locations of the vector objects within the pixel. For example, the CPU selects vector objects that do not extend past the boundaries of the pixel area, vector objects that cover the pixel center, vector objects that are located on a particular edge of the boundary of the pixel area, and so on. The CPU then discards the unselected vector objects, thereby removing these vector objects from further processing by the CPU or the GPU in generating an additional vector object.

The CPU generates an additional vector object based on one or more colors of the subset of the set of vector objects. For instance, if the subset of vector objects consist of a uniform color, the CPU generates the additional vector object to have the uniform color. However, if the subset of vector objects varies in color, the CPU may use a CPU scanline painting algorithm, an average color of the subset, a randomly selected color of the subset, and so on for the color of the additional vector object. The additional vector object may span the area of the pixel, and replace the subset of vector objects for subsequent processing by the CPU and/or the GPU. Additionally, the additional vector object can be a different type of vector object than the several different vector objects that were accessed within the area of the pixel to further simplify processing at low zoom levels. For instance, the several different vector objects may include several groups of Bezier objects, and the additional vector object may be a triangular geometric primitive generated using the several groups of Bezier objects.

Then, the CPU outputs the additional vector object in the pixel to the GPU. The GPU renders the additional vector object in the pixel of the vector artwork. Rendering the vector artwork can include the operations performed by graphics processing applications such as the vertex shader, tessellation shader, geometry shader, rasterizer, and so forth described above. However, these operations take less time and utilize fewer processing resources than conventional systems, because the graphics processing applications perform the operations on fewer vector objects at the low zoom levels. In one example, the CPU generates a cache that includes one or more of the original vector objects, the selected subset of vector objects, the additional vector object, and/or a color of the additional vector object, for efficient processing when switching between high and low zoom levels. By maintaining this cache, resolution independence is maintained to preserve the original pixel size of the vector artwork.

In the following discussion, an example environment is described that may employ the techniques described herein. Example procedures are also described which may be performed in the example environment as well as other environments. Consequently, performance of the example procedures is not limited to the example environment and the example environment is not limited to performance of the example procedures.

Example Environment

Figure 1:
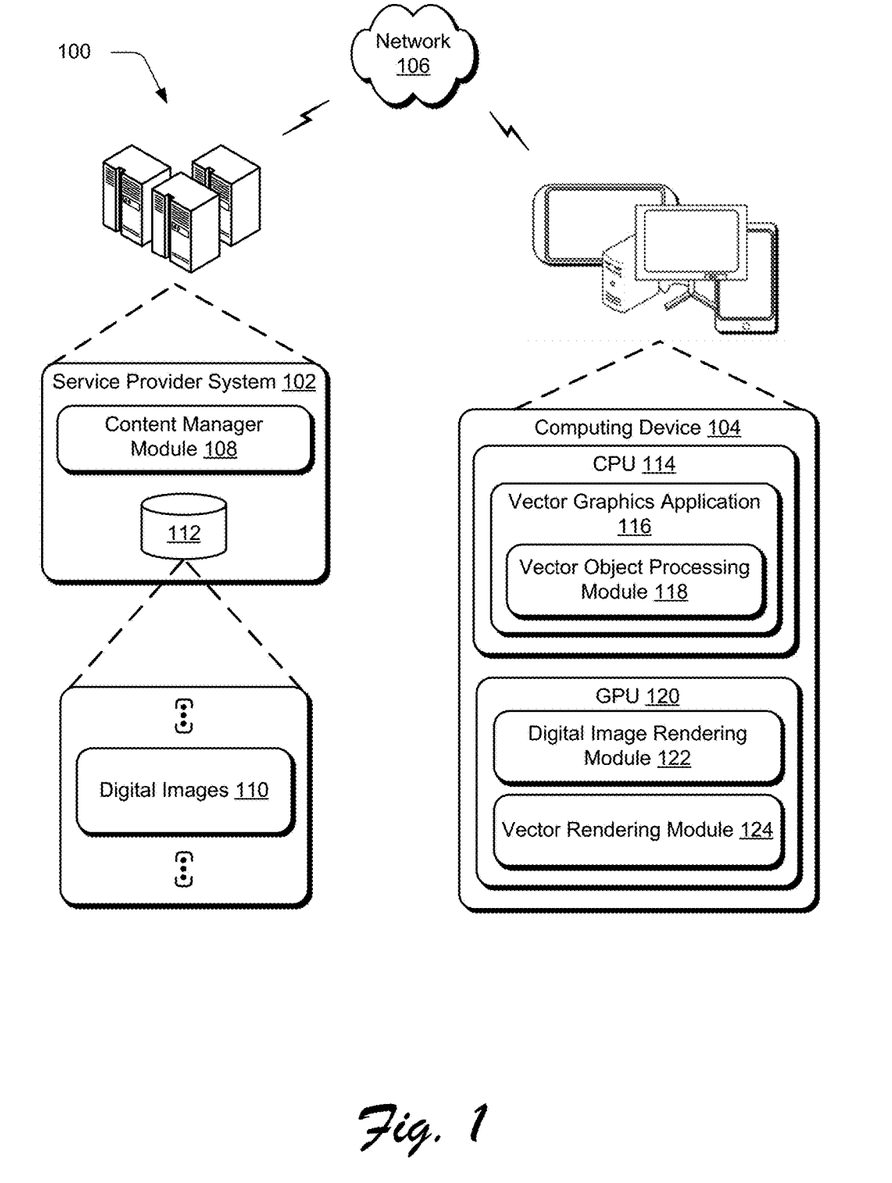
FIG. 1 is an illustration of an environment in an example implementation that is operable to employ techniques for processing geometric primitives of vector artwork as described herein.

FIG. 1 is an illustration of a digital medium environment 100 in an example implementation that is operable to employ techniques for processing vector objects of vector artwork as described herein. The illustrated environment 100 includes a service provider system 102 and a computing device 104 that are communicatively coupled, one to another, via network 106. Computing devices that implement the service provider system 102 and the computing device 104 may be configured in a variety of ways.

A computing device, for instance, may be configured as a desktop computer, a laptop computer, a mobile device (e.g., assuming a handheld configuration such as a tablet, digital camera, or mobile phone), and so forth. Thus, a computing device may range from full resource devices with substantial memory and processor resources (e.g., personal computers, game consoles) to a low-resource device with limited memory and/or processing resources (e.g., mobile devices). Additionally, although a single computing device is shown in some examples, the computing device may be representative of a plurality of different devices, such as multiple servers utilized by a business to perform operations "over the cloud" as shown for the service provider system 102, and as further described in FIG. 7.

The service provider system 102 is illustrated as including a content manager module 108 that is implemented at least partially in hardware of a computing device. The content manager module 108 is configured to manage online interaction via the network 106 of the computing device 104 with digital images 110, which are stored in storage 112 of the service provider system 102. As previously described, the digital images 110 may take a variety of forms, such as any content that may be stored digitally or electronically, e.g., vector artwork, movies, books, documents, games, applications, images, audio files, and so on. Thus, interaction with the digital images 110 by the computing device 104 via the network 106 may also take a variety of forms, such as selection of a menu item, voice command, gesture, selection of a hyperlink, and so forth.

The computing device 104 is shown as including a central processing unit (CPU) 114 that contains electronic circuitry within the computing device 104. The electronic circuitry of the CPU 114 carries out instructions of computer programs by performing arithmetic, logical, control, and input/output (I/O) operations specified by the instructions. The CPU 114 is shown as including a vector graphics application 116 which allows users to interact with digital images and vector artwork, such as by viewing, creating, assembling, editing, compressing, and so forth. Examples of applications that provide functionality which may be included in the vector graphics application 116 include Adobe Photoshop™, Adobe Illustrator™, Adobe InDesign™, and so forth. The computing device is also shown as including a vector object processing module 118, which may be included as part of the vector graphics application 116. The vector object processing module 118 is configured to process vector objects of digital images and vector artwork as discussed above and below.

Additionally, the computing device 104 is shown as including a graphics processing unit (GPU) 120. The GPU 120 is a specialized electronic circuit designed to rapidly manipulate and alter memory to accelerate creation of digital images and vector artwork in a frame buffer intended for output to a display device. The computing device 104 is further shown as including a digital image rendering module 122, which may be included as part of the GPU 120. The digital image rendering module 122 is configured to render digital images as discussed above and below. The computing device 104 is also shown as including a vector rendering module 124 configured to render vector artwork as discussed above and below. The vector rendering module 124 may additionally be included as part of the GPU 120.

In implementations, the vector object processing module 118 obtains a piece of vector artwork, such as from the digital images 110 located in the storage 112 of the service provider system 102 via the network 106, for example. The vector object processing module 118 of the CPU 114 accesses a set of several different vector objects in the vector artwork that are smaller than the size of a pixel, and generates an additional vector object for rendering by the digital image rendering module 122 or the vector rendering module 124 of the GPU 120. The vector artwork including the additional vector object can also be output by the computing device 104, such as to the service provider system 102 to be stored in the storage 112. The service provider system 102 can make digital images 110 available to additional devices, for example additional client devices via the network 106, e.g., part of a subscription-based service. By generating an additional vector object that is representative of several different vector objects, the CPU reduces processing on vector objects that will not be part of an output pixel, thus reducing unnecessary processing operations and time to render the vector artwork.

Figure 2:
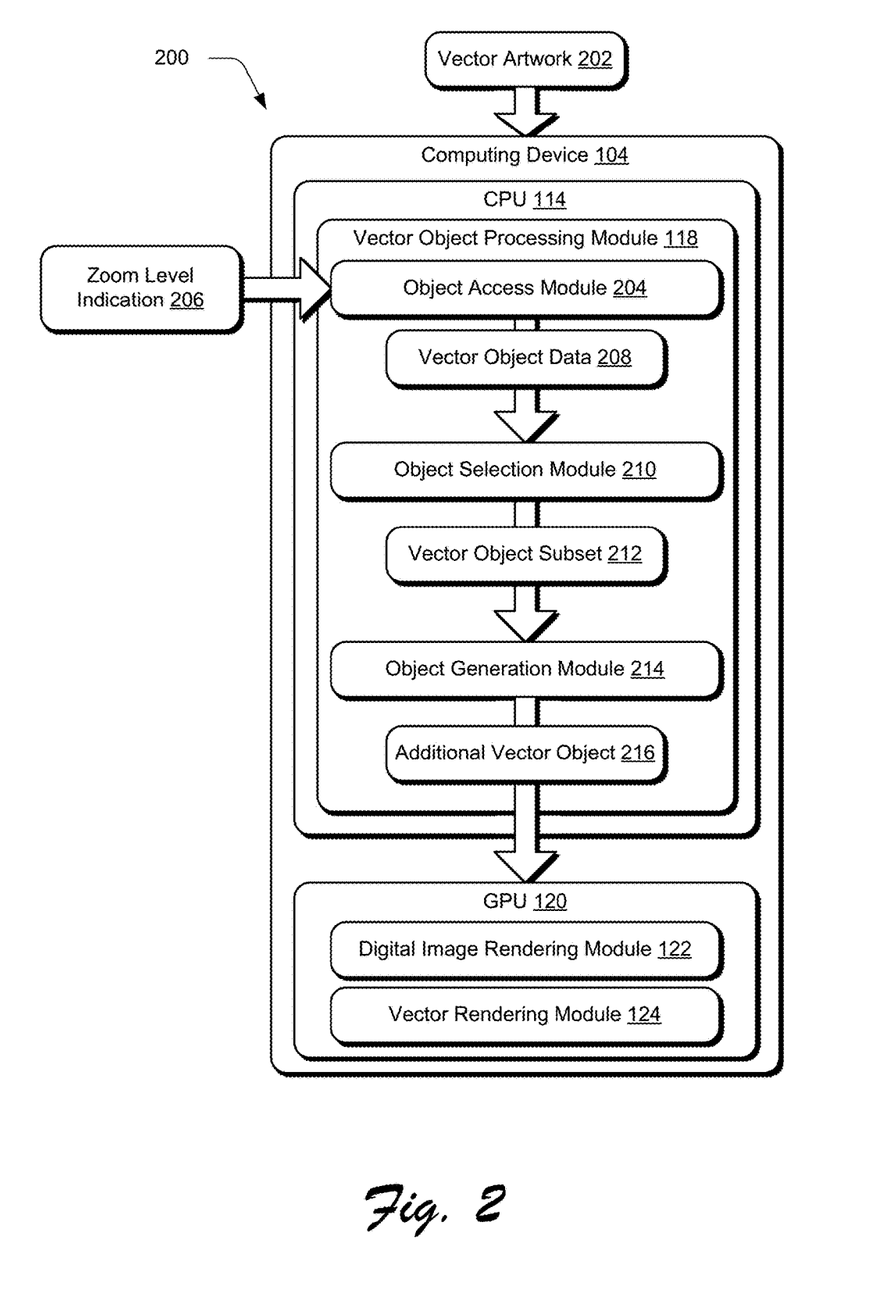
FIG. 2 depicts an example implementation showing operation of a geometric primitive processing module of FIG. 1 in greater detail.

FIG. 2 depicts a system 200 in an example implementation showing operation of the vector object processing module 118 of FIG. 1 in greater detail. To begin this example, an object access module 204 of the vector object processing module 118 receives a vector artwork 202, such as from the service provider system 102 described above. Additionally, the object access module 204 receives a zoom level indication 206 which includes information on a current zoom level of the vector artwork 202. The zoom level indication 206 may be received as a result of a change in zoom level due to a user input, a change in zoom level due to operations of the computing device 104, a zoom level at which the vector artwork 202 was received, and so forth.

In response, the object access module 204 accesses a set of several different vector objects in the vector artwork 202. Based on the received zoom level indication 206, the object access module 204 determines that the accessed vector objects are smaller than a size of a pixel at the current zoom level. In one example, the object access module 204 scans all or multiple vector objects of the vector artwork 202 at the zoom level included in the zoom level indication 206, and generates a list of vector objects that are located within a pixel. In another example, the object access module 204 scans vector objects of the vector artwork 202 at the zoom level included in the zoom level indication 206 of a subset of pixels surrounding the accessed vector objects to generate the list of vector objects located within a single pixel. From this, the object access module 204 generates vector object data 208 which includes indications of the several different vector objects located at a pixel. In addition, the vector object data 208 can include a location of the pixel, indications of vector objects that cover a center of the pixel, indications of vector objects that are partially located outside of the pixel boundary, and so on.

Figure 3:
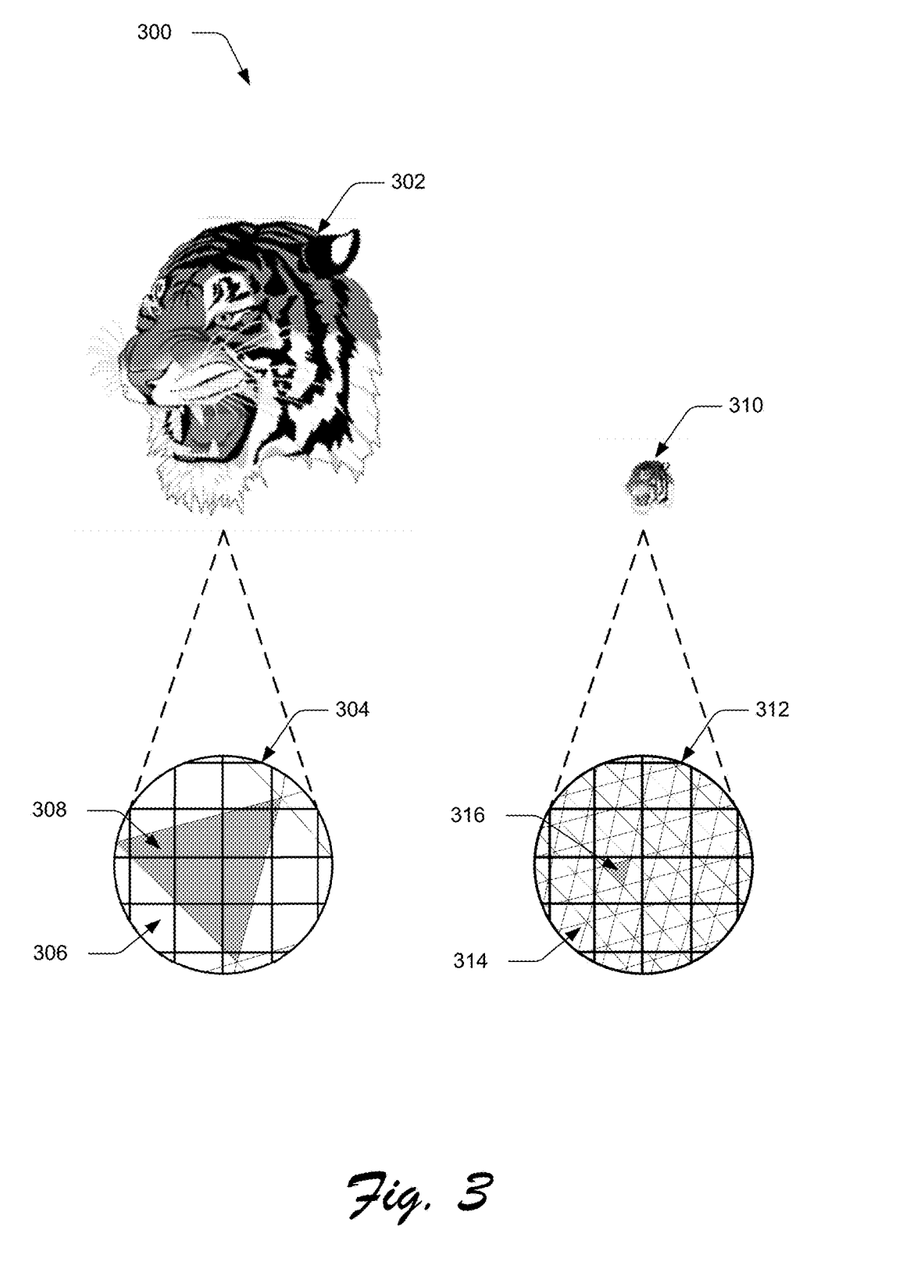
FIG. 3 depicts an example of geometric primitives being scaled, relative to a constant pixel size, as a zoom level of vector artwork changes.

For example, consider FIG. 3 depicting an example 300 of vector objects being scaled, relative to a constant pixel size, as a zoom level of a piece of vector artwork changes. A vector artwork 302 is shown at a first zoom level. A zoomed view 304 displays a subset of the pixels 306 of the vector artwork 302, along with vector objects used to create the vector artwork 302, one of which is represented by a geometric primitive triangle 308. At the zoom level of the vector artwork 302, the triangle 308 is larger than the individual pixels 306. In other words, a vector object used to create the vector artwork 302 does not fit entirely within the boundaries of one pixel. Accordingly, at the zoom level of the vector artwork 302, a GPU renders the vector artwork using the vector objects created in a tessellation operation when the vector artwork was first displayed.

Moving to the vector artwork 310, a same vector artwork is displayed as vector artwork 302, but has been zoomed out to a second, lower zoom level. A zoomed view 312 displays a subset of pixels 314, which in this example are the same as the subset of pixels 306. The zoomed view 312 also displays vector objects used to create the vector artwork 310, one of which is represented by a geometric primitive triangle 316. In this example, the geometric primitive triangle 316 is the same triangle as the geometric primitive triangle 308, but has reduced in size as a result of the zoom level decreasing from the vector artwork 302 to the lower zoom level of the vector artwork 310. As a result, the geometric primitive triangle 316 has become smaller than the individual pixels 314. Accordingly, at the lower zoom level of the vector artwork 310, a CPU replaces these vector objects with additional vector objects to be rendered by a GPU at the lower zoom level. The additional vector objects generated by the CPU in this scenario span an entire pixel at the lower zoom level, for instance. Consequently, the additional vector objects are fewer in number than the vector objects created in the tessellation operation, resulting in efficient processing by the GPU. Also, while the geometric primitive triangles 308 and 316 are used in the example 300, any suitable vector objects may be used once detected to be smaller than the size of a pixel, such as Bezier objects, groups of objects, and so forth.

Returning to a discussion of FIG. 2, an object selection module 210 receives the vector object data 208, and uses the vector object data to select a subset 212 of the several different vector objects indicated in the vector object data. In implementations, some vector objects are at least partially located within a pixel, but are not selected for the subset 212 because the vector objects do not contribute to an output pixel, such as vector objects that do not cover a center of the output pixel. Vector objects not selected for the subset 212 are discarded, removing them from further processing by the CPU or the GPU in generating an additional vector object.

The object selection module 210 can select the subset 212 in a variety of ways. For example, the object selection module 210 selects vector objects for the subset 212 that cover a pixel center of the pixel, i.e., based on a location of the pixel indicated in the vector object data 208. In yet another example, the object selection module 210 selects vector objects for the subset 212 that are located on a particular edge of the boundary of the pixel area (e.g., top edge, bottom edge, left edge, right edge), i.e., based on an indication in the vector object data 208 of vector objects that are partially located outside of the particular pixel boundary. Additional techniques for selecting vector objects for the subset 212 are also contemplated.

Figure 4:
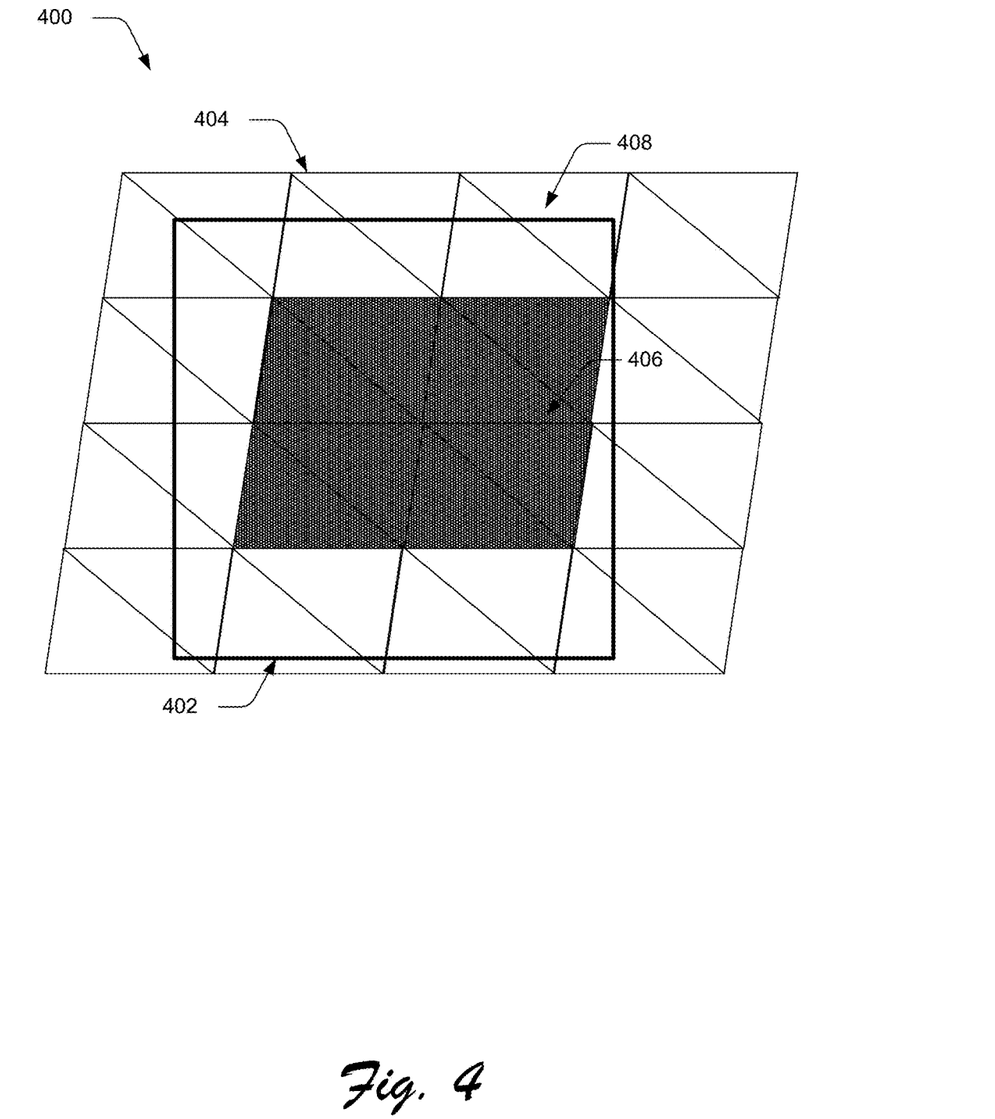
FIG. 4 depicts an example of selection of a subset of geometric primitives based on locations of geometric primitives relative to a pixel boundary which may be utilized by the geometric primitive processing techniques described herein.

As an illustration, consider FIG. 4, which depicts an example 400 of selection of a subset of vector objects based on locations of vector objects relative to a pixel center 402. The pixel center 402 represents the visible components of the pixel that will be output to the display. Based on a current zoom level of the vector artwork containing the pixel, several different vector objects fit at least partially within the area of the pixel, represented by the triangles 404.

In this example, the object selection module 210 uses an indication in the vector object data 208 of which vector objects cover the pixel center 402 to select which vector objects to include in the subset 212. Accordingly, the shaded vector objects 406 located within the pixel center 402 are selected for the subset. A set of vector objects 408 are vector objects that do not cover the pixel center. The vector objects 408 indicate vector objects which are discarded, and not used to generate an additional vector object.

Returning to the discussion of FIG. 2, the object generation module 214 receives the subset 212 of vector objects from the object selection module 210. The object generation module 214 generates an additional vector object 216 based on one or more colors of the subset 212 of vector objects. If the subset 212 of vector objects are a uniform color, then the object generation module 214 generates the additional vector object 216 to be the uniform color.

However, often the vector objects in the subset 212 are not a uniform color, and instead include a gradient of color between the vector objects, variable paint making up a pattern of an object in the vector artwork, and so on. In such cases, the object generation module 214 can generate the additional vector object 216 in a variety of ways. For example, the object generation module 214 can use a scanline painting algorithm to determine a color for the additional vector object 216. A scanline painting algorithm sorts vector objects by a top y-coordinate at which they first appear, and then each row or scanline of the vector artwork is computed using the intersection of a scanline with the vector objects on the front of the sorted list. The sorted list is updated to discard no-longer-visible vector objects as the active scan line advances down the vector artwork.

In another example, the object generation module 214 averages colors of the subset 212 of vector objects to determine a color for the additional vector object 216. Alternatively, the object generation module 214 randomly selects a color of one of the vector objects in the subset 212 to use as a color for the additional vector object 216.

The object generation module 214 can also generate the additional vector object 216 based on transparency of the subset of vector objects in different layers of the vector artwork. For example, vector artwork created in vector graphics applications such as Adobe Illustrator™ and Adobe InDesign™ commonly allow vector objects to be stacked in z-order. These applications support high-level constructs such as "transparency groups" and "layers" to allow different vector objects to be edited at different z-orders. Along with basing the additional vector object on color as discussed above, the primitive generation module 214 also adaptively reduces the number of vector objects in different layers of the z-dimension of the vector artwork to reduce processing time and resources at low zoom levels.

To do so, the object generation module 214 first determines whether a transparency group has a dimension of one pixel or less at a particular zoom level. If the transparency group is larger than one pixel, the transparency group is processed and rendered according to conventional techniques. However, if the transparency group is smaller than one pixel, the transparency group is modified to reduce the amount of processing time and resources are needed for rendering. For those transparency groups smaller than one pixel, the originally-generated vector objects throughout the layers are discarded in order to generate an additional vector object which is representative of the transparency group at a low zoom level.

To determine a color for the additional vector object representing the transparency group, the object generation module 214 examines the vector objects in multiple layers of the vector artwork, beginning with the top layer having the highest z-order. Using the subset 212 of vector objects, the object generation module 214 locates a layer of the transparency group that is an opaque color. For example, consider FIG. 5, which depicts an example 500 of color selection for an additional vector object based on different layers of a piece of vector artwork. In the example 500, the arrow 502 represents descending z-order of layers of transparency groups in a piece of vector artwork.

Figure 5:
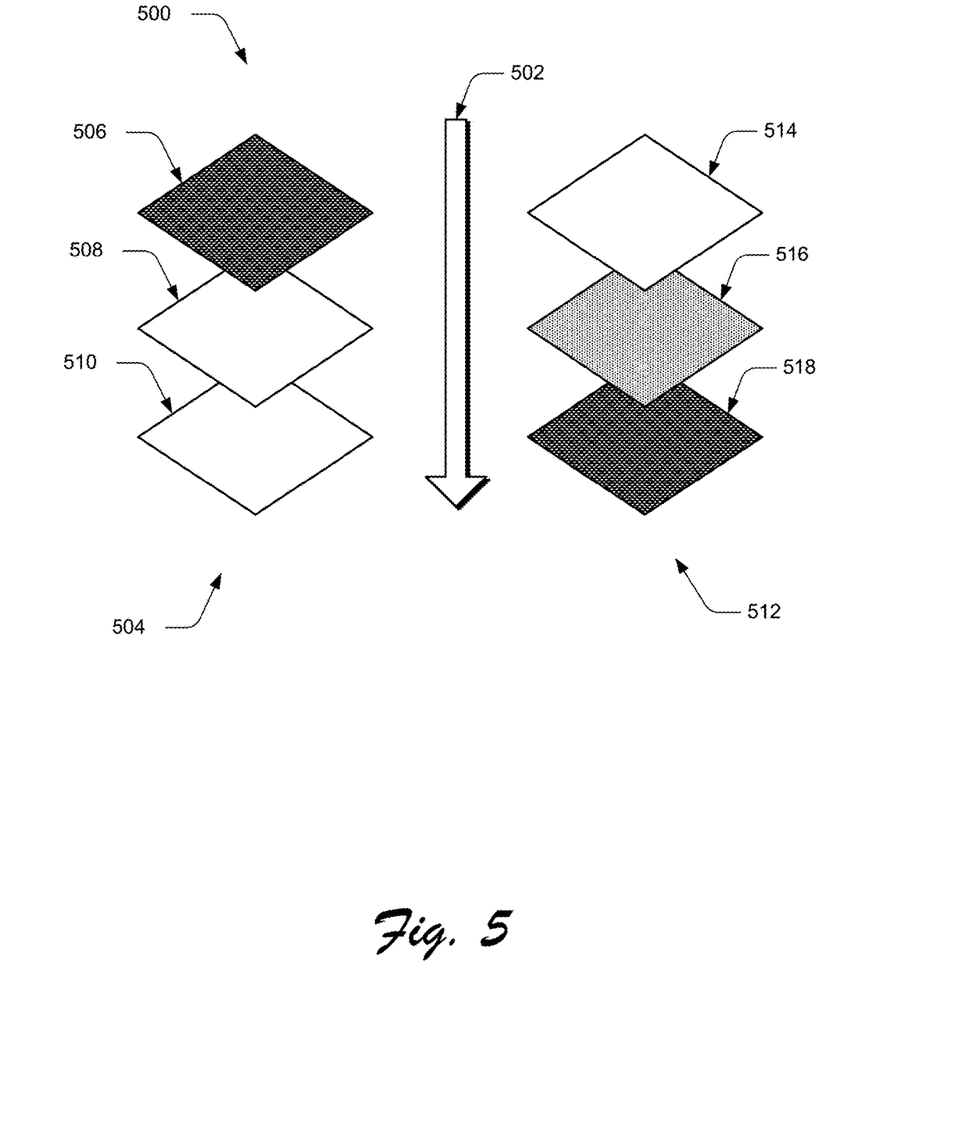
FIG. 5 depicts an example of color selection for an additional geometric primitive based on different layers of a vector artwork which may be utilized by the geometric primitive processing techniques described herein.

A first transparency group 504 is shown that includes three layers 506, 508, and 510. The object generation module 214 examines the layers 506, 508, and 510 in descending z-order looking for an opaque layer to use for the color of the additional vector object 216. In this transparency group 504, the top-most layer 506 is an opaque color, so the object generation module 214 uses the color of the layer 506 to generate the additional vector object 216. With the color of the additional vector object 216 determined, the object generation module 214 does not continue examining the remaining layers 508 and 510, saving time and processing resources.

A second transparency group 512 is also shown that includes three layers 514, 516, and 518. The object generation module 214 examines the layers 514, 516, and 518 in descending z-order looking for an opaque layer to use for the color of the additional vector object 216. In this transparency group 512, the top-most layer 514 is transparent, so the object generation module 214 continues to the next layer 516 in descending z-order. While the layer 516 has some opacity, the layer is still partially transparent, so the object generation module 214 continues on to the final layer 518. The final layer 518 is an opaque color, so the object generation module 214 uses the combined color of the layers 514, 516 and 518 to generate the additional geometric primitive 216. If color variation exists in the x-y plane (relative to the z-ordered layers 502), the object generation module can use a scanline algorithm, an average color of the vector objects, or a randomly selected color of the vector objects as the color for the additional vector object 216, as discussed above. Alternatively, the object generation module 214 may choose a random layer and use a color of the randomly chosen layer for the additional vector object 216.

Returning to the discussion of FIG. 2, the object generation module 214 can generate the additional vector object 216 for output to the GPU 120 in a variety of ways. For example, the additional vector object 216 is generated to be a same or similar size as the pixel that the additional vector object represents. This can be accomplished by generating a triangular geometric primitive spanning the width of the pixel, drawing a one-pixel-long line geometric primitive the length of the pixel, and so forth. In another example, the object generation module 214 sets one pixel on the screen directly using the information from the subset 212 of vector objects, using techniques common to applications such as OpenGL™ glDrawPixels™, and so on.

As discussed above, vector objects can encompass an array of different objects used to create vector artwork or a digital image. One type of vector object is a Bezier object, also known as a Bezier surface. A Bezier object is defined by a set of control points and is "stretched" towards the control points as though each control point were an attractive force. Multiple Bezier objects can be "patched" together to represent components of a vector artwork, such as a smooth surface. Each Bezier object can be composed of multiple geometric primitive triangles used to create a mesh to shape the surface of the Bezier object in the vector artwork.

In some cases, a Bezier object (or a transparency group that includes multiple triangles, as discussed above) is smaller than one pixel at low zoom levels. In these cases, the object generation module 214 determines an amount of fractional pixel coverage of the Bezier object or transparency group, along with determining a color of the Bezier object or transparency group. Then, the object generation module 214 multiplies a color value for the determined color of the Bezier object or transparency group by the amount of fractional pixel coverage. The object generation module 214 generates the additional vector object 216 to be a particular color based on the color of the Bezier object or transparency group multiplied by the amount of fractional pixel coverage. For example, a Bezier object with a red color value in RGBA space (1.0, 0, 0, 1.0) that covered one half of a pixel area would result in an additional vector object 216 (e.g., a triangle spanning the pixel area) with a color value of (1.0, 0, 0, 0.5).

The object generation module 214 of the CPU 114 outputs the additional vector object 216 to the digital image rendering module 122 or the vector rendering module 124 of the GPU 120. The digital image rendering module 122 and the vector rendering module 124 are configured to render the vector artwork 202 including the additional vector object 216 using techniques such as texture mapping, rendering polygons, rotation and translation of vertices into different coordinate systems, shading pixels, oversampling and interpolation to reduce aliasing, and so forth. The digital image rendering module 122 or vector rendering module 124 may output the vector artwork 202 including the additional vector object 216 to a user interface that enables a user of the computing device 104 to edit or modify the vector artwork 202, and/or distribute the vector artwork to the service provider system 102, to name some examples.

Additionally, the vector object processing module 118 outputs the one or more of the original vector objects, the selected subset of vector objects, the additional vector object, and/or a color of the additional vector object in a cache to store for reuse if the vector artwork 202 switches between high and low zoom levels. The vector object processing module 118 initializes the cache by generating and outputting the vector object subset 212 and/or the additional vector object 216 the first time a zoom level causes an originally-created vector object to reduce below the size of one pixel. Subsequently, the cache is reused to further reduce processing time and resources when switching between high and low zoom levels.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

Figure 6:
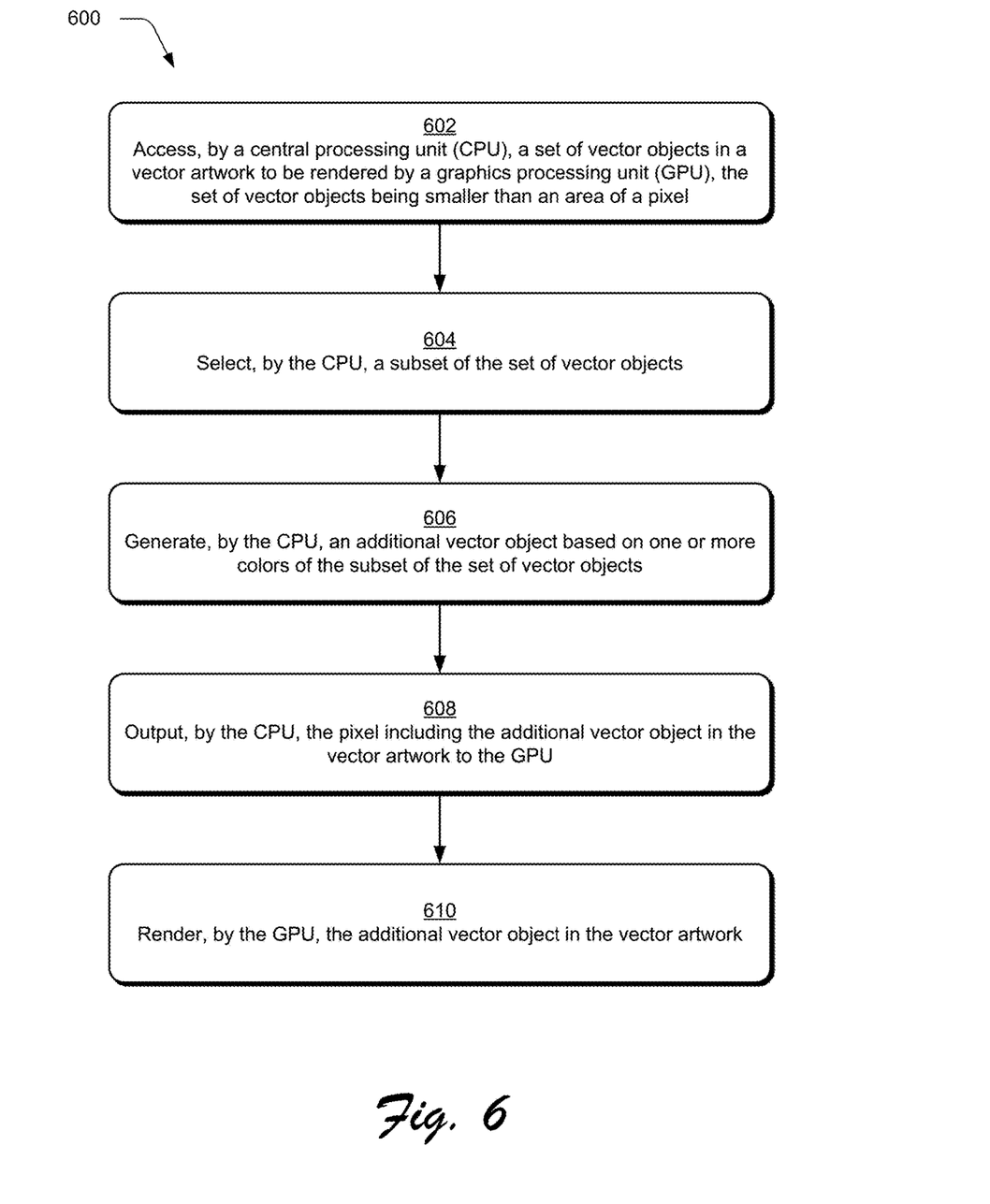
FIG. 6 is a flow diagram depicting a procedure in an example implementation in which geometric primitives at low zoom levels are processed to generate an additional geometric primitive for output as part of a piece of vector artwork in a digital image creation system.

FIG. 6 depicts a procedure 600 in an example implementation in which vector objects at low zoom levels are processed to generate an additional vector object for output as part of a digital image or vector artwork in a digital image creation system. First, a CPU access a set of vector objects in a digital image or vector artwork to be rendered by a GPU, where the set of vector objects are smaller than an area of a pixel (block 602). For example, the CPU accesses several vector objects in a piece of vector artwork, analyzes bounding boxes of the several vector objects to determine which of the vector objects lie within the area of one device pixel. The set of vector objects are smaller than the area of the pixel due to the current zoom level of the digital image or vector artwork. As discussed above, the object access module 204 generates vector object data 208 based on a zoom level indication 206 including indications of the set of vector objects located at the pixel. In addition, the vector object data 208 includes a location of the pixel, indications of vector objects that are located entirely within the pixel boundary, indications of vector objects that are partially located outside of the pixel boundary, and so on.

The CPU selects a subset of the set of vector objects (block 604). The object selection module 210 of the CPU selects vector objects for the subset 212 that cover a pixel center of the pixel, vector objects that are located on a particular edge of the boundary of the pixel area (e.g., top edge, bottom edge, left edge, right edge), and so forth. In one example, some vector objects are at least partially located within the pixel, but are not be selected for the subset 212 based on locations of the vector objects relative to the pixel. Vector objects that do not contribute to an output pixel, such as those that are partially located within a pixel but do not cover the pixel center, are not selected for the subset 212. Vector objects not selected for the subset 212 are be discarded, removing them from further processing by the CPU or the GPU in generating an additional vector object.

The CPU then generates an additional vector object based on one or more colors of the subset of the set of vector objects (block 606). If the subset 212 of vector objects are a uniform color, then the object generation module 214 generates the additional vector object 216 to be the uniform color. If the subset 212 of vector objects are a non-uniform color, the object generation module 214 generates the additional vector object 216 using a scanline painting algorithm, by averaging color values of the subset, or by selecting a random color from the subset, to name a few examples. The additional vector object 216 is the size of a single pixel at the current zoom level, for instance.

In some cases, the vector objects in the subset 212 include transparency groups. When transparency groups become smaller than one pixel based on a zoom level of the vector artwork, the originally-generated vector objects throughout the layers are discarded in order to generate an additional vector object which is representative of the transparency group at a low zoom level. The object generation module 214 examines the vector objects in multiple layers of the vector artwork to determine a color for the additional vector object 216, beginning with the top layer having the highest z-order. Using the subset 212 of vector objects, the object generation module 214 locates a layer of the transparency group that is an opaque color, and uses the opaque color for the additional vector object 216.

Additionally, a Bezier object made up of multiple triangles may become smaller than one pixel at low zoom levels. In these cases, the object generation module 214 determines an amount of fractional pixel coverage of the Bezier object. The object generation module 214 also determines a color of the Bezier object using techniques discussed above, such as by averaging colors of the Bezier object or selecting a random color of the Bezier object. Then, the object generation module 214 multiplies a color value for the determined color of the Bezier object or transparency group by the amount of fractional pixel coverage. The object generation module 214 generates the additional vector object 216 to be a particular color based on the color of the Bezier object multiplied by the amount of fractional pixel coverage of the Bezier object.

Next, the CPU outputs the pixel including the additional vector object in the digital image or vector artwork to the GPU (block 608). Additionally, the vector object processing module 118 can generate a cache that includes the one or more of the original vector objects, the selected subset of vector objects, the additional vector object, and/or a color of the additional vector object to store for reuse if the vector artwork 202 switches between high and low zoom levels. Lastly, the GPU renders the vector object in the vector artwork (block 610). For example, the GPU renders the vector artwork including the additional vector object at a low zoom level in a user interface of the computing device 104. Reducing the number of vector objects at low zoom levels greatly reduces unnecessary processing time and resources on vector objects that may not contribute to a pixel output in a display.

Example System and Device

Figure 7:
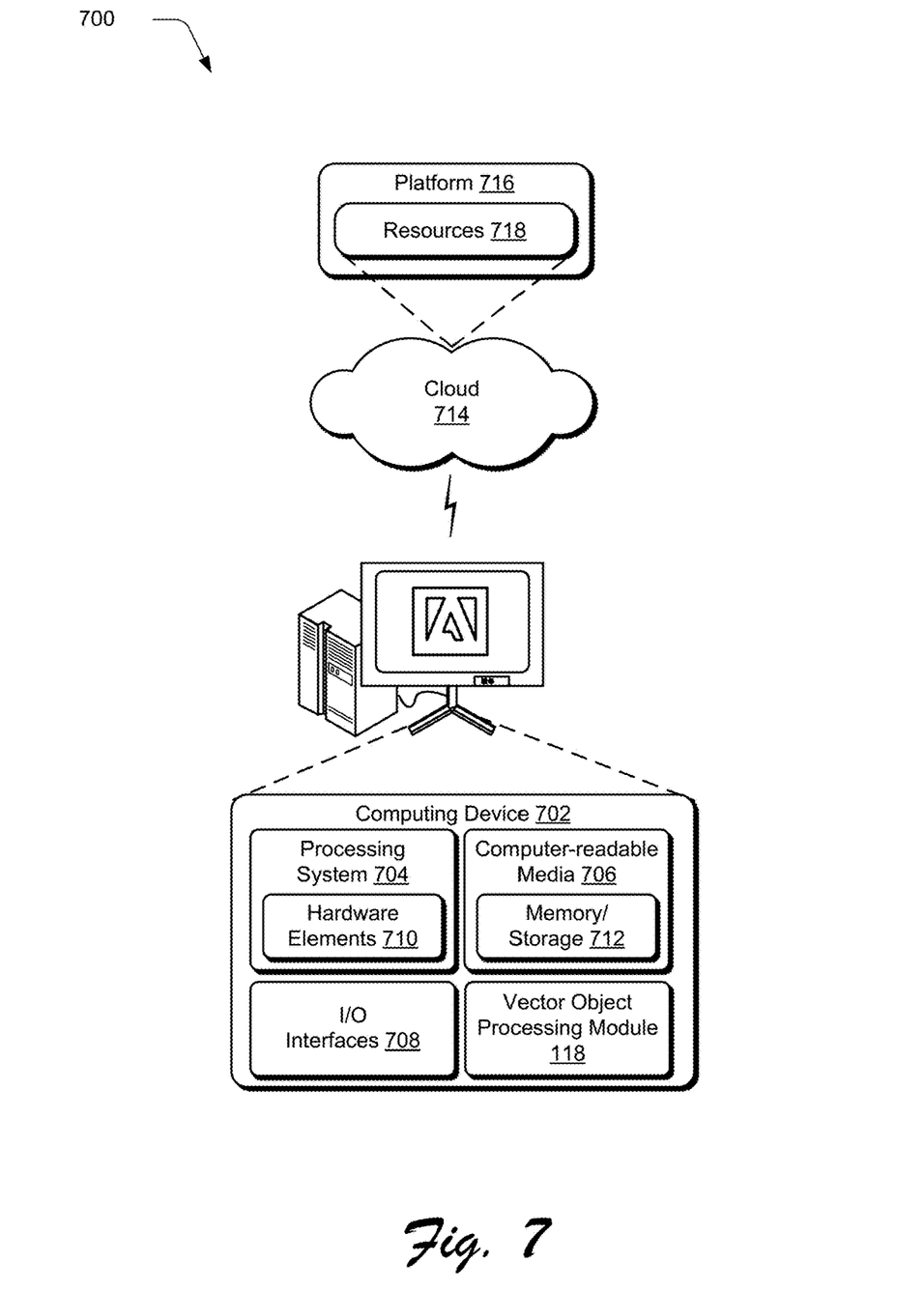
FIG. 7 illustrates an example system including various components of an example device that can be implemented as any type of computing device as described and/or utilized with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the vector object processing module 118. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to process vector objects of a vector artwork, a method implemented by a computing device, the method comprising:
    accessing, by a central processing unit (CPU) of the computing device, a set of vector objects in the vector artwork to be rendered by a graphics processing unit (GPU) of the computing device, the set of vector objects being smaller than a size of a pixel;
    selecting, by the CPU, a subset of the set of vector objects;
    generating, by the CPU, an additional vector object based on one or more colors of the subset of the set of vector objects;
    outputting, by the CPU, the pixel including the additional vector object in the vector artwork to the GPU; and
    rendering, by the GPU of the computing device, the vector artwork.

2. The method of claim 1, wherein the vector artwork is to be rendered at a zoom level that causes the set of vector objects to fit within an area of the pixel.

3. The method of claim 1, wherein selecting the subset of the set of vector objects is based on locations of the set of vector objects relative to a boundary of the pixel.

4. The method of claim 1, wherein selecting the subset of the set of vector objects is based on locations of the set of vector objects relative to a center of the pixel.

5. The method of claim 1, wherein the subset of vector objects is a uniform color, and wherein the generating the additional vector object includes causing the additional vector object to have the uniform color.

6. The method of claim 1, wherein the subset of vector objects is non-uniform in color, and wherein the generating the additional vector object includes determining an average color of the one or more colors of the subset and causing the additional vector object to have the average color.

7. The method of claim 1, wherein the subset of vector objects is non-uniform in color, and wherein the generating the additional vector object includes determining a random color of the one or more colors of the subset and causing the additional vector object to have the random color.

8. The method of claim 1, wherein the vector artwork includes multiple layers, and wherein the generating further comprises:
    locating an opaque layer of the multiple layers; and
    causing the additional vector object to have a color of the opaque layer and one or more layers above the opaque layer.

9. The method of claim 1, wherein the subset of the set of vector objects includes a Bezier object, and wherein the generating further comprises:
    determining an amount of fractional pixel coverage of the Bezier object;
    multiplying the amount of fractional pixel coverage by a color value of the Bezier object; and
    causing the additional vector object to have a color based on the amount of fractional pixel coverage multiplied by the color value of the Bezier object.

10. The method of claim 1, further comprising:
    generating a cache that includes the vector object subset and a color of the additional vector object; and
    using the cache to render the vector artwork responsive to a zoom level of the vector artwork changing.

11. A computing device comprising:
    a central processing unit (CPU) including:
        an object access module to access a set of vector objects in a vector artwork, the set of vector objects being smaller than a size of a pixel;
        an object selection module to select a subset of the set of vector objects based on locations of the set of vector objects within the pixel; and
        an object generation module to generate an additional vector object based on one or more colors of the subset; and
    a graphics processing unit (GPU) including a rendering module to render the pixel of the vector artwork that includes the additional vector object.

12. The system as described in claim 11, wherein the object selection module selects the subset of the set of vector objects based on at least one of locations of the set of vector objects relative to a boundary of the pixel or locations of the set of vector objects relative to a center of the pixel.

13. The system as described in claim 11, wherein the subset of vector objects is a uniform color, and wherein the object generation module generates the additional vector object by causing the additional vector object to have the uniform color.

14. The system as described in claim 11, wherein the subset of vector objects is non-uniform in color, and wherein the object generation module generates the additional vector object by determining an average color of the one or more colors of the subset and causing the additional vector object to have the average color.

15. The system as described in claim 11, wherein the subset of vector objects is non-uniform in color, and wherein the object generation module generates the additional vector object by determining a random color of the one or more colors of the subset and causing the additional vector object to have the random color.

16. The system as described in claim 11, wherein the object generation module is further configured to generate a cache that includes the vector object subset and a color of the additional vector object, and the rendering module is further configured to use the cache to render the vector artwork responsive to a zoom level of the vector artwork changing.

17. In a digital medium environment to process vector objects of a vector artwork in a digital image creation system, a system comprising:
    means for accessing, by a central processing unit (CPU) of a computing device, a set of vector objects in the vector artwork to be rendered by a graphics processing unit (GPU) of the computing device, the set of vector objects being smaller than a size of a pixel;
    means for selecting, by the CPU, a subset of the set of vector objects;
    means for generating, by the CPU, an additional vector object based on one or more colors of the subset of the set of vector objects;
    means for outputting, by the CPU, the pixel including the additional vector object in the vector artwork to the GPU and discarding vector objects of the set of vector objects not included in the subset of the set of vector objects; and means for rendering, by the GPU of the computing device, the additional vector object in the vector artwork.

18. The system as described in claim 17, wherein the vector artwork is to be rendered at a zoom level that causes the set of vector objects to fit within an area of the pixel.

19. The system as described in claim 17, wherein the vector artwork includes multiple layers, and wherein the means for generating is further configured to:
  locate an opaque layer of the multiple layers; and
  cause the additional vector object to have a color of the opaque layer.

20. The system as described in claim 17, wherein the subset of the set of vector objects includes a Bezier object, and wherein the means for generating is further configured to:
  determine an amount of fractional pixel coverage of the Bezier object;
  multiply the amount of fractional pixel coverage by a color value of the Bezier object; and
  cause the additional vector object to have a color based on the amount of fractional pixel coverage multiplied by the color value of the Bezier object.

* * * * *